United States Patent [19]

Fram

[11] 3,992,967
[45] Nov. 23, 1976

[54] FIBER CUTTER
[75] Inventor: Morris Fram, Sun Valley, Calif.
[73] Assignee: Ransburg Corporation, Indianapolis, Ind.
[22] Filed: Oct. 31, 1975
[21] Appl. No.: 627,870

[52] U.S. Cl. ................................ 83/347; 30/128; 83/913
[51] Int. Cl.² .......................................... D01G 1/04
[58] Field of Search ............ 83/346, 347, 913, 348; 30/128

[56] References Cited
UNITED STATES PATENTS

| | | | |
|---|---|---|---|
| 1,158,180 | 10/1915 | Cohn | 83/346 |
| 1,693,589 | 12/1928 | Bolton | 83/346 X |
| 2,429,945 | 10/1947 | Rayburn | 83/346 X |
| 3,074,303 | 1/1963 | Waters | 83/347 |
| 3,117,376 | 1/1964 | Nawalanic | 83/346 X |
| 3,763,561 | 10/1973 | Scharfenberger | 30/128 |
| 3,823,633 | 7/1974 | Ross | 83/346 |

*Primary Examiner*—Frank T. Yost
*Attorney, Agent, or Firm*—Merrill N. Johnson

[57] ABSTRACT

A fiber cutter for cutting lengths of glass fibers and glass rovings into short lengths includes a cutter roller carrying a plurality of cutting blades and shaped annular means cooperatively associated with a resilient back-up roll means. In operation the force executed between the cutter roller and the back-up roller controls the spacing between the rollers by forcing the shaped annular means into the resilient surface of the back-up roller means. In addition to permitting control of spacing, the coaction of the cutter roller with its shaped annular means and the resilient back-up roll means holds the rollers in alignment, reduces the bounce between the rollers as the blades engage and pass over the back-up roll means and permit force to be used to build the blades in engagement with the back-up roll means without blade breakage.

8 Claims, 5 Drawing Figures

FIBER CUTTER

The present invention relates to a fiber cutter for cutting fibers such as glass roving fibers and the like into short lengths. More particularly, the invention is directed to a fiber cutter including rotatable cutter and back-up rolls, and shaped annular means rotatably associated with the cutter roll to assist in controlling the spacing between the cutter and the back-up roll, in maintaining the cutting pressure exerted on the fibers during the cutting operation, in minimizing flexing of the back-up roll, and in minimizing the impact experienced by the cutting blades during the cutting operation.

It is known to use cut lengths of glass roving fibers in chopped strand mats to be used in, among other things, plastic articles to reinforce such articles. For example, glass roving fibers can be cut into appropriate lengths and then impregnated with a thermosetting plastic resin or a thermoplastic resin to produce reinforced plastic molding compounds used to make reinforced plastic articles. Also, it is known to mix cut lengths of glass fibers with a plural component material such as a thermosetting resin, and in paticular, polyester resin, to make plastic articles of polyester resin reinforced with glass fibers. Polyester resin reinforced with cut lengths of glass fiber is used in boat hulls, car body panels, bathroom fixtures and the like. Polyester resin reinforced with cut lengths of glass fiber has high chemical and heat resistance, good impact and tensile strength, dimensional stability, stiffness and hardness. Other uses of cut glass fibers are also known.

Glass fibers to be cut or chopped into short lengths by a fiber cutter are usually provided as a plurality of extended lengths of relatively small diameter gathered together. The gathered glass fibers are generally called "strands". The diameter of the individual glass fibers is usually in the range of about $10 \times 10^{-5}$ to about $75 \times 10^{-5}$ inches. Generally, there are about 200 glass fibers per strand. However, a strand may have more or less glass fibers depending on, for example, the diameter of the individual glass fibers. Glass roving includes a number of untwisted strands grouped in a bundle to form a continuous ribbon of multiple strands.

The glass roving supplied from a bundle to a fiber or glass roving cutter is severed by the action of the cutter section thereof into lengths of about one-eight to four inches prior to being impregnated to produce a reinforced plastic molding compound or prior to being mixed with a plural component material such as polyester resin to reinforce the same.

A presently available glass roving cutter employed to cut the glass roving into the desired lengths includes a cutter roll carrying a plurality of roving cutter blades, the blades are in engagement with a back-up roll having a flexible surface to thereby provide a nip into which the glass roving is fed during operation of the roving cutter. A pressure roll engages the back-up roll and feeds the glass roving to the nip. A roving cutter wherein each of the rollers are fixed relative to one another is shown in U.S. Pat. No. 2,995,173. The blades of the cutter roll press the glass roving against the resilient surface of the back-up roll to thereby sever the roving into short lengths called "chop". A cutter roll may operate at speeds of up to about 3000 revolutions per minute.

During operation of a glass roving cutter wherein each of the rolls are fixed relative to one another, the resilient surface of the back-up roll experiences wear due to the flexing engagement of that surface with the cutting blades of the cutter roll, thereby reducing the cutter pressure between the cutter roll and the back-up roll. The maintenance of the cutting pressure of the fiber cutter within a given range is necessary if the fiber cutter is to provide glass chop of substantially uniform length having unfrayed extremities. Glass chop having a non-uniform length and/or frayed extremities is not desirable for it affects the appearance and strength of the composite in which it is used.

U.S. Pat. No. 3,491,443 discloses a glass roving cutter wherein the cutter roll is self-adjusting relative to the back-up roll to compensate for wear to thereby provide a substantially uniform cutting pressure during operation of the glass roving cutter. The cutter roll of the roving cutter is spring biased against the resilient surface of the back-up roll to compensate for wear of the resilient surface of the back-up roll to thereby provide a substantially uniform cutting pressure. U.S. Pat. No. 3,034,213 shows the use of a single adjustment screw for adjustably supporting a back-up roll with respect to a cutter roll.

According to one form of the invention there is provided a fiber cutter employing a back-up roll means having a resilient surface against which the fiber is pressed and cut into desired lengths by a cutter roll means, the cutter roll means includes shaped annular means or rings shaped in cross section to displace to an increasing degree the resilient surface of the back-up roll to provide appropriate spacing between the back-up roll and the cutter roll, to hold the cutter roll means and back-up roll in alignment, to minimize flexing of the back-up roll by the cutter blades, to minimize the impact experienced by the cutting blades upon engagement with the surface of the back-up roll during the cutting operation, to reduce the bounce between the cutter roll means and the back-up roll and to permit more force to be imposed to hold the cutter roll means and back-up roll in engagement. Subjecting the relatively fragile cutting blades to unregulated impact with the surface of the back-up roll frequently renders the blades ineffective for their intended purpose, that is, cutting fiber. Typically, a cutting blade includes a delicate razor knife edge that tends to experience pitting or fracture of its razor knife edge when the edge experiences repeated high impact during the cutting operation. Preferably, the surface of the back-up roll is relatively rigid or hard, that is, sufficiently rigid or hard as to assist in minimizing flexing during the cutting operation, yet provide a surface against which the desired cutting action can be accomplished easily and conveniently. It should be recognized that a back-up roll with an extremely hard surface may cause undesirable damage to the delicate razor knife edge of a cutting blade, therefore, a surface that has some flexibility is used in practice. One object of the invention is to use the combination of a delicate knife cutting edge and back-up roll with a relatively rigid or hard surface. The surface of the back-up roll means may be selected from the group including polymeric and rubber materials. Other features and advantages of my fiber cutter, such as less cost, ease of repair and adjustment and the like will be apparent from the following disclosure.

Figure 3:
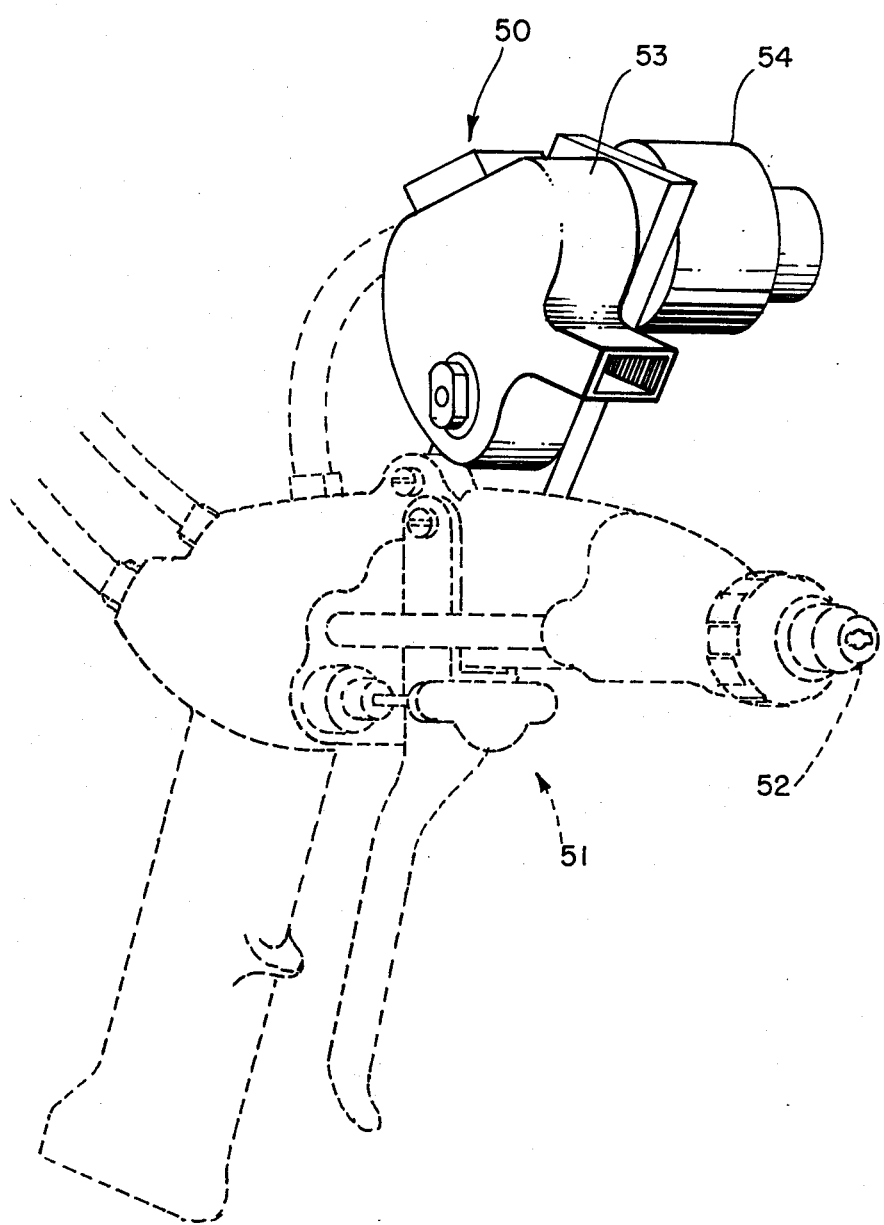
FIG. 3 is a perspective view of a fiber cutter embodying another form of the concepts of this invention shown mounted on a internal mix polyester spray gun.
Figure 4:
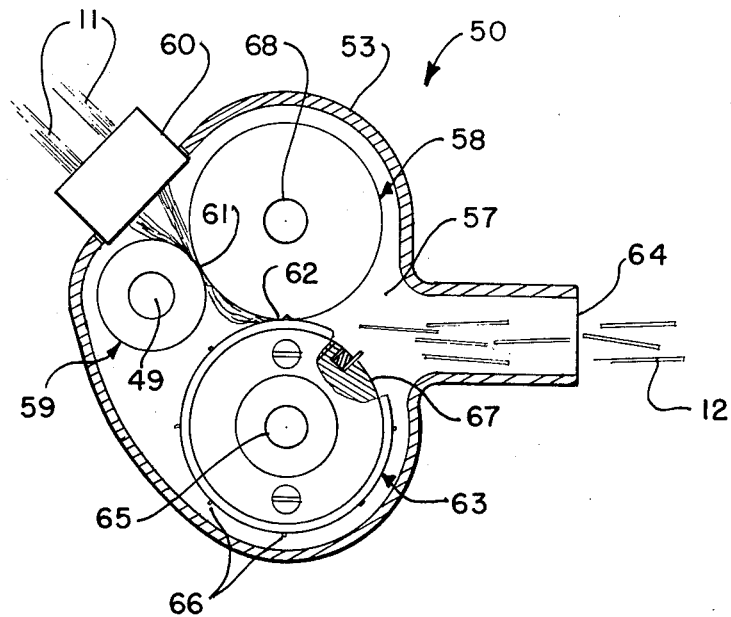
FIG. 4 is a side view of the fiber cutter of FIG. 3 with parts thereof removed.
Figure 5:
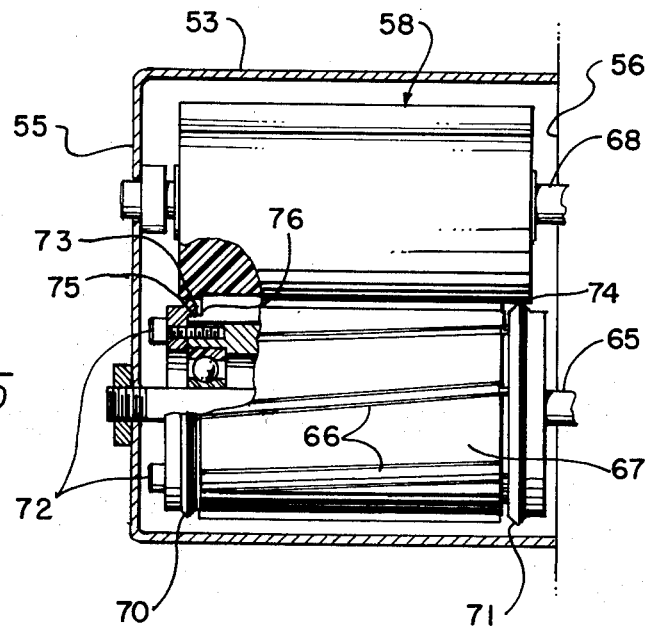
FIG. 5 is a front sectional view of the fiber cutter of FIG. 3 with parts thereof removed.

The concepts of this disclosure have applicability to a fiber cutter wherein the cutting blades are spaced relatively far apart and wherein the cutting blades have a razor knife cutting edge. Although the present disclosure has particular applicability to a glass roving fiber cutter, it should be understood that the concepts of this disclosure are also applicable to fiber cutters that can be used to cut fibers other than glass roving fibers. It is recognized that the rolls of a fiber cutter may have axial lengths of two to three inches to several feet or more. As a matter of convenience, FIGS. 1 and 2 show a fiber cutter generally used for high capacity cutting of glass roving, and FIGS. 3 to 5 show a glass roving fiber cutter to be used with a plural component spray device.

Figure 1:
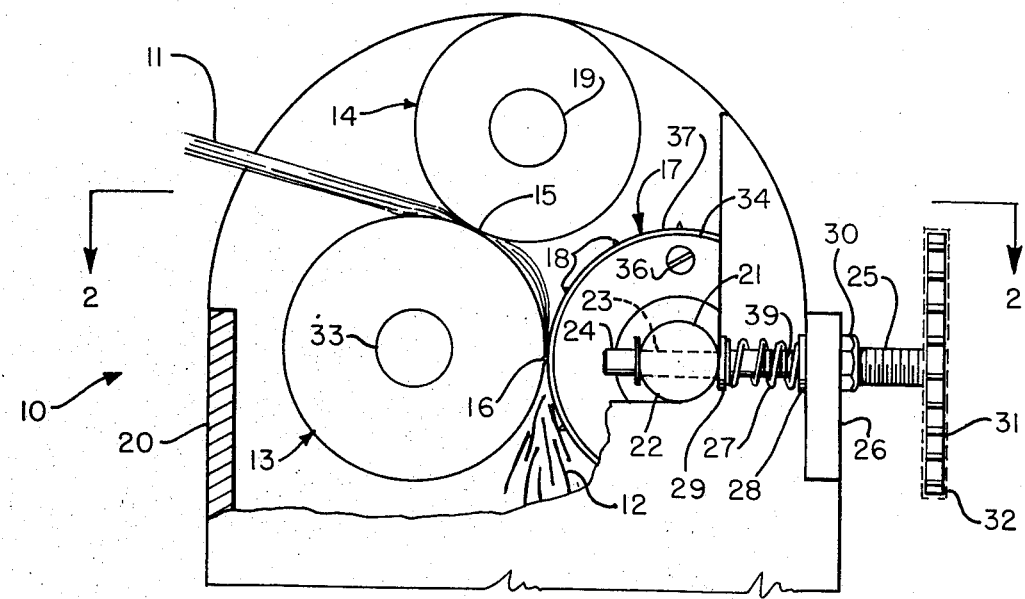
FIG. 1 is a partial side sectional view of a fiber cutter incorporating one form of the concept of the invention.
Figure 2:
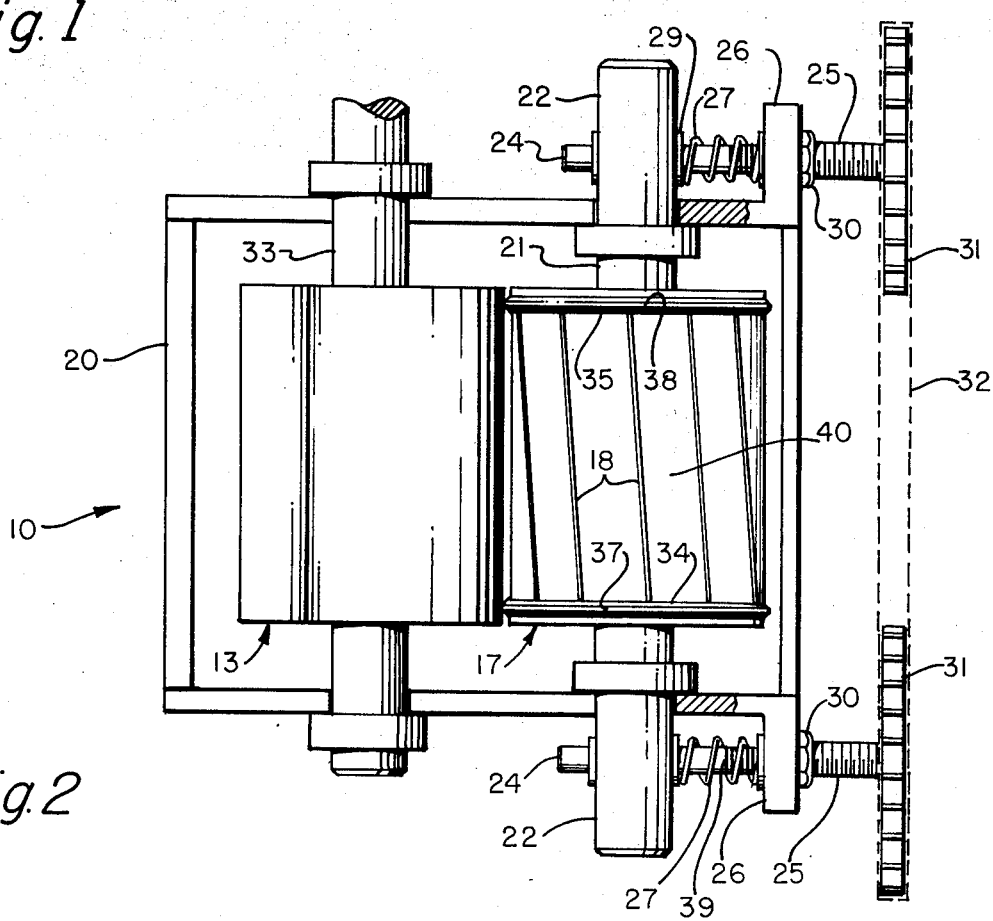
FIG. 2 is a partial top sectional view of the fiber cutter of FIG. 1.

Referring now to FIGS. 1 and 2 of the drawing, and particularly to FIG. 1, a high capacity fiber cutter incorporating the concepts of this disclosure is indicated by the reference numeral 10. The fiber cutter 10 is especially adapted to cut glass roving fibers 11 into the desired short lengths 12. It is to be understood that the fiber cutter 10 may be used to cut fibers other than glass roving into short lengths.

The fiber cutter includes a back-up roll means 13 in rotational engagement with a pressure roll means 14 to thereby define a nip 15 into which glass roving fibers 11 are introduced and fed to a nip 16 defined by the back-up roll 13 and a cutter roll means 17. The glass roving fibers 11 are chopped or cut in the nip 16 defined by the back-up and cutter rolls to provide cut roving 12. Preferably, the back-up roll 13 and the pressure roll 14 are provided with a relatively hard or rigid face.

The back-up roll 13 is made of any suitable material such as a polymeric or rubber material, for example, polyurethane rubber, and preferably relatively hard polyurethane rubber having a hardness of up to Shore A95. The material used to make the back-up roll 13, preferably has good rigidity, and wear and strength characteristics and is not significantly marred by multiple engagements with the razor knife edge of a cutting blade 18 carried by cutter roll 17, provided the depth of the cutter blade entry into the surface of the back-up roll 13 is controlled.

The surface 40 of the cutter roll 17 is hard or rigid and is provided with a plurality of razor knife edge cutting blades 18 extending therefrom which effect the cutting of the glass roving fibers 11 as the roving passes through the nip 16 defined by the back-up roll 13 and cutter roll 17.

The cutting blades 18 are arranged along the peripheral surface 40 of the cutter roll 17 in circumferentially spaced, substantially parallel relationship. The cutting blades 18 each have a razor knife cutting edge projecting a short distance from surface 40 of the cutter roll 17. The cutting edge of each of the blades 18 is substantially straight and suitably carried by the cutter roll 17 in a plane that is at an angle with the plane of rotation of the cutter roll. The circumferential distance between each of the individual cutting blades 18 dictates the length of the cut roving 12 ejected from the fiber cutter 10.

The pressure roll 14 is biased into engagement with the back-up roll 13. The pressure roll 14 may either be arranged in fixed engagement with the back-up roll 13, gravitationally biased into engagement with the back-up roll, or spring biased into engagement with the back-up roll. For purposes of illustration, the pressure roll 14 is gravitationally biased against the back-up roll 13. Where the pressure roll 14 is gravitationally biased, shaft 19 carrying the pressure roll may be arranged for substantially vertical movement along suitable guideways (not shown) formed in the side walls of the housing means 20. The weight of the pressure roll 14 biases it against the back-up roll 13 to provide the proper pressure therebetween for effecting the desired feed of the glass roving fibers 11 to the nip 16 defined by the back-up roll 13 and cutter roll 17.

The back-up roll 13 is driven in the illustrated embodiment as it is more simple to drive a roll that is not movable than to drive a roll that is movable such as either the pressure roll 14 or cutter roll 17. Thus, driving force is transmitted from the back-up roll 13 to the pressure roll 14 and cutter roll 17 causing them to rotate at substantially the same speed during operation of the cutter. Any suitable means (not shown) can be used to drive the rolls of the fiber cutter 10. Since the drive means (not shown) can be of any known suitable form, of which many are conventionally used, a detailed showing thereof has been omitted from the drawing in the interest of a clearer showing of the inventive portion of this disclosure.

The rolls 13, 14 and 17 are supported by the housing means 20. The housing means 20 may be made from any suitable structurally strong and wear resistant material such as metal. The rotational axes of the rolls are substantially parallel, although they may be toed toward each other if desired. The cutter roll 17 is carried by shaft 21. Shaft 21 extends beyond the opposite end faces of the cutter roll 17 to define mounting end supports 22. The cutter roll 17 is suitably supported by bearing means (not shown) on the shaft 21. Each of the mounting end supports 22 is provided with a transversely extending aperture 23, preferably, arranged along a diameter for receiving a guide rod 24. The guide rod 24 is attached at one end to a threaded shank 25 that is threadedly received in a housing part 26. A coil spring means 27 is received on the guide rod 24 and bottomed at one end on a collar 28 and at the other end on a washer 29 that bears against the mounting end support 22. Thus, rotation of the threaded shank 25 in one direction causes movement of the collar 28 toward the back-up roll 12 and thereby transmits through the coil spring means 27 and cutter roll mounting end supports 22 a tensioning force when the cutter roll 17 is in abutting relation with the back-up roll 13. Similarly, rotation of the threaded shank 25 in the opposite direction causes a lessening of cutter roll pressure by allowing the spring 27 to release stored energy to thereby expand. A locknut 30 is provided on the threaded shank 25 which coacts with the housing part 26 to lock the threaded shank in the selected position. Further, a sprocket 31 is secured to threaded shank 28 and through a chain 32 connected to the sprocket for adjusting the spring tension at the other end of the cutter roll 17 to thereby obtain substantially uniform spring pressure against the mounting end supports 22 at opposite ends of the cutter roll.

Shaped annular means 34 and 35 are fixedly attached to the extremities of the cutter roll 16 by bolts 36 turned into threaded, female recesses (not shown). The annular means 34 and 35 each has a diameter that is slightly greater tha the diameter of the cutter roll 17. The outer radial extremity of each of the annular means 34 and 35 includes an annular surface 37 and 38, respectively, of progressively reduced thickness. As shown in FIG. 2, the relatively thin annular surfaces 37 and 38 engage with the circumferential surface of the back-up roll 13.

The cutter roll 17 is rotatably driven by rotational displacement of the annular means 34 and 35.

Referring again to FIG. 1, the razor knife cutting edges of the cutting blades 18 may project a slight distance beyond the radial extent of the annular means 34 and 35. The extent that the razor knife cutting edges of the cutting blades 18 project beyond the radial extent of the annular means 34 and 35 is dictated by, among other things, the hardness of the surface of the back-up roll 13 and the force with which the cutter blades engage the surface of the back-up roll to appropriately cut the glass roving. As shown in FIG. 1, the cutting blades 18 penetrate the relatively hard surface of the back-up roller 12 only an amount necessary to cut roving fibers 11. The extent that the razor knife cutting edges of the cutting blades penetrate the surface of the back-up roll 13 is, preferably, but a small fraction of an inch. The extent that the cutting blades penetrate the surface of the back-up roll 13 is easily controlled and accurately adjusted by the pressure of the shaped annular means 34 and 35 against the resilient back-up roll 13. More pressure corresponds to more cutting blade penetration into the back-up roll and vice versa. Turning threaded shank 25 performs a dimensional positioning function because of the shape of the surface of annular means pressing into the sightly resilient surface of the back-up roll 13. The surface of the back-up roll 13 should be at least slightly resilient in order to appropriately adjust the center-to-center distance between the cutter roll 17 and the back-up roll 13. It is seen that more pressure brings the cutter roll and the back-up roll closer together while less pressure takes those rolls apart. The shape of the annular means and the resilience of the surface at the back-up roll are correlated to permit control of roll to roll spacing with forces attainable with good engineering practice.

It should be appreciated that in the embodiment shown in FIGS. 1 and 2, the back-up roll 13 is rotatably driven by a suitable drive means and rotational displacement of the back-up roll 13 through shaft 33 transmits a driving force to the cutter roll 17 by virtue of frictional engagement of the cutter roll with the annular means 34 and 35 and to the pressure roll 14 by virtue of frictional engagement of the pressure roll with the circumferential surface of the back-up roll.

In order to determine the cutter roll pressure, and to render the roving cutter in this embodiment capable of being easily and quickly initially adjusted for operation, a plurality of equally, axially-spaced rings or annular grooves 39 are provided on the guide rod 24 adjacent the free end thereof, whereby the proper cutter roll pressure may be quickly and easily established when rotating the threaded shank 25 to tension the spring 27, by rotating the threaded shank until a predetermined number of rings or grooves 39 are visually observed adjacent the mounting end support 22. Instructions for adjusting spring pressure may accompany the fiber cutter unit or may even be directly applied to the machine to enable the user to quickly and easily adjust the tension on the cutter roll. Therefore, problems of estimating the cutter roll pressure are minimized. The spring mounting arrangement for the cutter roll compensates for conditions in service.

Referring now to FIG. 3, a fiber cutter 50 embodying the concepts of the present invention is shown in cooperative association with a spray gun 51. The spray gun 51 is shown in dotted lines. The details of the structure and function of the spray gun 51 are not disclosed here since such details are discussed in U.S. Pat. No. 3,330,484. The cutter 50 is suitably carried by the gun 51. As shown in FIG. 2, the cutter 50 chops or cuts glass roving 11 into lengths of cut roving 12, and ejects the cut roving into a spray ejected from a nozzle 52 at the forwardmost extremity of the gun 51 as shown in FIG. 1. The spray ejected from the nozzle 52 consists essentially of plural component material (not shown) such as polyester resin mixed with a suitable catalyst such as methyl ethyl ketone peroxide. The cut roving 12 and the plural component material are mixed externally of the cutter 50 and the gun 51 and are applied to an application surface such as a forming mold (not shown) which serves to form the mixture into a plastic article of manufacture.

As shown in FIG. 1, the fiber cutter 50 includes a housing means 53 for supporting several of the component parts of the fiber cutter. An air motor 54 is suitably affixed to a side closure 55 of housing means 53. The side closure 55 and a side closure 56 are used to close opposite sides of the housing means 53.

Referring to FIGS. 4 and 5 a cavity 57 is provided by the cooperative relation between the housing means 53 and the side closures 55 and 56 and is referred to hereinafter as cutting chamber 57. The housing 53 and the side closures 55 and 56 are fabricated from any suitable structurally strong and wear resistant material such as metal and the like.

A back-up roll means 58 and a pressure roll means 59 are suitably carried by and positioned between the side closure 55 and the side closure 56. Roving fibers 11 from a glass roving bundle (not shown) are introduced into the cutting chamber 57 through an apertured guide block 60 to the inlet end of a nip 61 defined by the structural cooperation between the back-up roll 58 and the pressure roll 59 in the manner shown in FIG. 4. The roving 11 is discharged from the outlet end of the nip 61 between the back-up roll 58 and the pressure roll 59 by the counterclockwise rotation of back-up roll 58 and the clockwise rotation of the pressure roll 59. The roving fibers 11 discharged from the nip 61 are fed to a nip 62 provided by the structural cooperation between the back-up roll 58 and a cutter roll means 63. As the glass roving passes between the back-up roll 58 and the cutter roll 63 due to the counterclockwise rotation of back-up roller 58 and the clockwise rotation of the cutter roll 63, the roving is cut into lengths of cut roving 13 and ejected from an ejection opening 64 at the forward end of fiber cutter 50. FIG. 4 shows the fiber cutter 50 cutting glass roving 11 into lengths of cut roving 12.

The cutter roll 63 is concentrically mounted on a shaft 65. The cutter roll 63 is rotatably journalled on shaft 65 by suitable bearing means. The shaft 65 is suitably carried by the side closures 55 and 56 of housing 53. The cutter roll 63 carries a plurality of cutting blades 66 that are arranged along its peripheral surface in circumferentially spaced, substantially parallel relationship. The cutting blades 66 each have a razor knife cutting edge projecting a short distance from surface 67 of the cutter roll 63. The cutting edge of each of the blades 66 is substantially straight and suitably carried by the cutter roll 63 in a plane that is at an angle with the plane of the axis of rotation of the cutter roll. The circumferential distance between each of the individual cutting blades 66 dictates the length of the cut roving 12 ejected from the fiber cutter 50. The main body of the cutter roll 63 is fabricated from any structurally strong and rigid material such as rigid plastic, metal and the like.

The pressure roll 59 is concentrically mounted on shft 49 and is carried by side closures 55 and 56 of housing 53. The pressure roll 59 is made of any suitable material such as a polymeric or rubber material.

The back-up roll 58 is concentrically mounted on a shaft 68. The shaft 68 is rotatably journalled in side closures 55 and 56 of housing 53 so as to be rotationally driven by the motor 54. The back-up roll 58 is made of any suitable material such as a polymeric or rubber material, for example, relatively hard polyurethane rubber, and preferably hard polyurethane rubber. The material used to make the back-up roll 58, preferably, has good rigidity, and wear and strength characteristics and is not significantly marred by multiple engagements with the razor knife edge of a cutting blade 66, provided depth of a blade entry into the back-up roll 58 is controlled. As disclosed hereinbefore, a back-up roll with an extremely hard surface may cause undesirable damage to the delicate razor knife edge of a cutter blade, therefore, a surface that has some flexibility is used in practice.

As shown in FIG. 5, annular means 70 and 71 are fixedly attached to the opposite extremities of the cutter roll 63 such as by bolts 72 turned into threaded, female recesses. The annular means 70 and 71 each have a diameter that is slightly greater than the diameter of the cutter roll 63. The outer radial extremity of each of the annular means 70 and 71 includes an annular surface 73 and 74, respectively, of progressively reduced thickness. As shown in FIGS. 4 and 5, annular surfaces 73 and 74 engage with the back-up roll 58. The cutter roll 63 is rotatably driven by rotational displacement of the annular means 70 and 71.

Referring again to FIG. 5, the cutting blades 66 project a slight distance beyond the radial extent of the annular means 70 and 71. The degree that the cutting blades 66 project beyond the radial extent of the annular means 70 and 71 to appropriately cut the glass roving is dictated by, among other things, the hardness of the surface of the back-up roll 58 and the force with which the cutting blades must engage the surface of the back-up roll. The projection of the cutting blades beyond the radial extent of the annular means 70 and 71 is easily controlled and accurately adjusted by the pressure of the annular means against the surface of the back-up roll 58. More pressure corresponds to more penetration of the cutting blades 66 into the surface of the back-up roll 58 and vice versa. As shown in FIG. 5, the cutting blades 66 penetrate the surface of the back-up roll 58 only an amount necessary to cut roving 11. The degree that the cutting blades penetrate the surface of roll 58 is, preferably, but a small fraction of an inch.

It should be apreciated that the back-up roller 58 is rotatably driven by the motor 54 and rotational displacement of the back-up roll means 58 by shaft 68 transmits a driving force to the cutter roll 63 by virtue of frictional engagement of the back-up roll with the annular means 70 and 71 and to the pressure roll 59 by virtue of frictional engagement of the pressure roll with the circumferential surface of the back-up roll.

The drive motor 54 may be a pneumatic or air motor, although it should be appreciated that the drive motor may be any other suitable type. The structure of the fiber cutter 50 is described with the back-up roll 58 being motor-driven, however, it should be understood that the cutter roll 63 may be driven by the drive motor 54 instead of the back-up roll 58.

Referring again to FIG. 3, the drive motor 54 is of standard construction, and therefore, in the interest of clarity, the details of the drive motor have been omitted from the drawing and this disclosure. The shaft 68 of the back-up roll 58 is directly connected to the motor 54 so as to rotatably drive the back-up roll in such a direction as to ensure that cut roving 13 is directed toward and out the ejection opening 64 of the fiber cutter 50.

It is presently preferred to connect the annular means 70 and 71 to cutter roll 63 so that, among other things, shoulder 75 of the annular means can engage with flange 76 of the cutter blades 66 to thereby assist in retaining the cutter blades in position on the cutter roll 63.

It will be understood that modifications and variations may be effected without departing from the scope of the novel concepts of the present invention.

I claim:

1. A fiber cutter comprising rotatable cutter roll means and rotatable back-up roll means in cooperative relationship to provide a nip, the cutter roll menas including fiber cutter blades and the back-up roll means including a resilient surface engaging with the cutter blades for cutting fiber in the nip into short lengths, and shaped annular means fixedly attached to the extremities of the cutter roll, each of said shaped annular means having a diameter slightly greater than the diameter of the cutter roll and an annular surface of progressively reduced thickness which engages with the circumferential surface of the back-up roll so as to maintain the spacing between the cutter roll and the back-up roll substantially constant during operation of the fiber cutter, and means to drive the fiber cutter.

2. The fiber cutter of claim 1, wherein the surface of the back-up roll means is relatively hard.

3. The fiber cutter of claim 2, wherein the annular means provides a driving force to the back-up roll means.

4. The fiber cutter of claim 2, wherein the annular means are fixedly attached to the cutter roll means.

5. The fiber cutter of claim 4, wherein the cutter blades project a short distance beyond the annular means.

6. A fiber cutter for ejecting cut lengths of fibers into a spray of plural component material comprising a back-up roll and a cutter roll in cooperative relationship to provide a nip for the fiber to be cut, the back-up roll including a resilient surface with a hardness of Shore A95 engaging with the cutter blades, and two shaped annular means mounted on the extremities of the cutter roll biased into engagement with the resilient surface of the back-up roll, each annular means having a diameter slightly greater than the diameter of the cutter roll and an annular surface of progressively reduced thickness and a relatively thin annular face shaped to displace the resilient surface of the back-up roll to an increasingly greater degree as the cutter roll and the back-up roll are forced together and thus maintain appropriate spacing between the two rolls whereby the cutting pressure of the nip exerted on the fiber during operation of the fiber cutter is maintained substantially constant during operation.

7. The cutter of claim 6, wherein the relatively hard surface of the back-up roll is a material selected from the group including polymeric and rubber materials.

8. The fiber cutter of claim 6, wherein the cutter blades project a short distance beyond the annular means.

* * * * *